Figure 1:
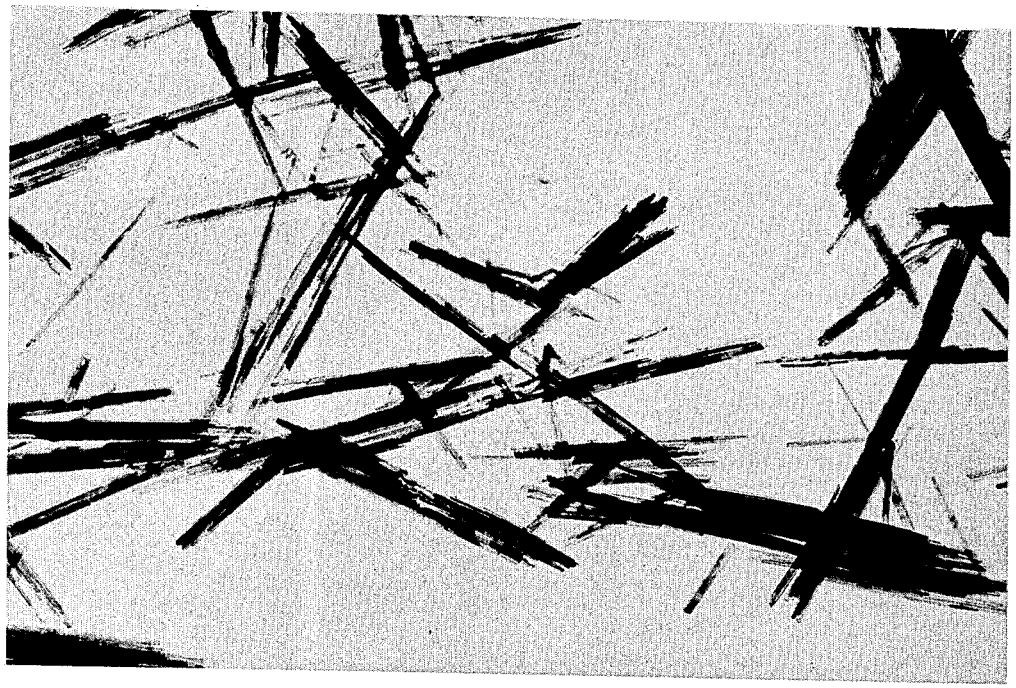

United States Patent [19]

Kopke et al.

[11] 4,059,716

[45] Nov. 22, 1977

[54] MANUFACTURE OF GAMMA-IRON(III) OXIDE

[75] Inventors: Helmut Kopke, Ludwigshafen; Manfred Ohlinger, Frankenthal; Werner Grau, Willstaett; Eduard Schoenafinger, Ludwigshafen; Hans Henning Schneehage, Mutterstadt, all of Germany

[73] Assignee: BASF Aktiengesellschaft, Ludwigshafen, Germany

[21] Appl. No.: 586,346

[22] Filed: June 12, 1975

[30] Foreign Application Priority Data

June 14, 1974 Germany .............................. 2428875

[51] Int. Cl.$^2$ ......................... H01F 1/11; H01F 10/02
[52] U.S. Cl. .................................... 428/403; 427/130
[58] Field of Search .............................. 427/127–132, 427/48; 428/403; 252/62.54

[56] References Cited

U.S. PATENT DOCUMENTS

| | | | |
|---|---|---|---|
| 3,574,683 | 4/1971 | Johnston | 427/128 |
| 3,652,334 | 3/1972 | Abeck et al. | 427/127 X |
| 3,794,519 | 2/1974 | Akashi et al. | 427/128 |
| 3,892,888 | 7/1975 | Halaby et al. | 427/127 |

FOREIGN PATENT DOCUMENTS 7,240,758  10/1972  Japan

*Primary Examiner*—Bernard D. Pianalto
*Attorney, Agent, or Firm*—Keil, Thompson & Shurtleff

[57] ABSTRACT

A process for the manufacture of acicular gamma-iron(III) oxide which, because of its improved dispersibility in organic binders, is suitable for the manufacture of magnetic recording media exhibiting a particularly high orientation ratio. For this purpose, the non-magnetic acicular α-iron(III) oxide or goethite pigment is treated with from 0.5 to 10% by weight, based on the pigment, of a compound of the formula I:

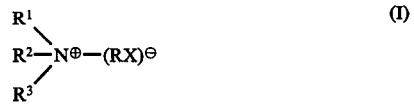

where $R^1$, $R^2$ and $R^3$ are hydrogen, alkyl of 1 to 24 carbon atoms or alkenyl of 1 to 24 carbon atoms and (RX)$^-$ is selected from the group consisting of an aliphatic carboxylic acid of 1 to 18 carbon atoms, an aromatic carboxylic acid of 1 to 18 carbon atoms, a sulfonic acid and an ester of phosphoric acid and is then further processed by conventional methods to give gamma-iron(III) oxide.

5 Claims, 3 Drawing Figures

MANUFACTURE OF GAMMA-IRON(III) OXIDE

The present invention relates to a process for the manufacture of acicular gamma-iron(III) oxide which is particularly suitable for use in magnetic recording media.

Acicular gamma-iron(III) oxide with a length/width ratio of the needles of 20 : 1 to 3 : 1 is still the magnetic pigment predominantly used in magnetic recording media. It is manufactured by dehydrating non-magnetic acicular geothite to alpha-iron(III) oxide, reducing this to magnetite and reoxidizing the latter to gamma-iron(III) oxide.

The size and shape of the particles have a decisive effect on the magnetic properties of gamma-iron(III) oxide. Whilst the size and shape of the magnetic gamma-iron(III) oxide particles are largely determined by the dimensions of the goethite or alpha-iron(III) oxide particles used for conversion to gamma-iron(III) oxide, the way in which the conversion is carried out also plays a decisive role. If the dehydration of the goethite to alpha-iron(III) oxide or the subsequent reduction of the alpha-iron(III) oxide to magnetite is carried out at temperatures which are too high, the needles sinter to form coarse particles and agglomerates.

This effect manifests itself in a decrease in coercive force and makes the magnetic pigment more difficult to disperse in the binder system. However, it is also possible to carry out the dehydration and the reduction at relatively low temperatures so that the disadvantages described do not manifest themselves to the same degree. Admittedly, lower space-time yields must be accepted under these conditions.

Processes for converting goethite into gamma-iron(III) oxide are also known, in which sintering can be prevented by coating the surface of the particles of the non-magnetic starting material with inorganic substances (German published applications (DOS) Nos. 1,592,214 and 1,803,783). It has also already been proposed to treat goethite with solutions of aluminum, titanium or zirconium salts and alkali metal silicates, the pH of the solutions being adjusted to values at which hydrolysis starts (German printed application (DAS) No. 1,252,646).

Whilst these methods make it possible to substantially retain the acicular shape of the particles during the conversion process, the gamma-iron(III) oxides thus obtained are frequently difficult to disperse in an organic binder. Moreover, the relatively poor orientability of such coated particles has an adverse effect on the quality of a magnetic recording medium.

German printed application (DAS) No. 1,771,327 describes the coating of goethite or alpha-iron(III) oxide with a hydrophobic aliphatic carboxylic acid or with such an acid and morpholine, followed by the direct conversion of the pigments treated in this way to gamma-iron(III) oxide in air at elevated temperature. However, this direct conversion has the disadvantage that it is no longer possible to carry out a heat treatment at intermediate stages of the manufacture of the gamma-iron(III) oxide; such a heat treatment is of particular advantage when manufacturing low-noise iron oxides with low print-through properties for use as magnetic pigments in magnetic recording media. A similar coating of iron oxide pigments to avoid agglomeration after manufacture, as disclosed in German printed application (DAS) No. 1,767,608, has the disadvantage that the pigment suspension used must first be brought to a pH of about 7 which may entail extra expenditure, depending on the manufacturing process.

It is an object of the present invention to provide a process for the manufacture of a readily dispersible and highly orientable magnetic gamma-iron(III) oxide. It is a further object of the invention to so design the process that it is applicable regardless of whether the goethite has been manufactured in acid or alkaline medium.

We have found that a cicular gamma-iron(III) oxide of high coercive force is obtained by treating an acicular non-magnetic alpha-iron(III) oxide or goethite pigment with an organic compound, drying the treated pigment, heating the pigment coated with the organic compound to from 250° to 700° C in an inert or reducing gas atmosphere and subsequently oxidizing the magnetite formed in an oxidizing atmosphere at from 150° to 500° C, if the pigment is coated with from 0.5 to 10% by weight, based on the pigment, of a compound of the formula I:

where $R^1$, $R^2$ and $R^3$ are hydrogen, alkyl of 1 to 24 carbon atoms and alkenyl of 1 to 24 carbon atoms and $(RX)^-$ is selected from the group consisting of an aliphatic carboxylic acid of 1 to 18 carbon atoms, an aromatic carboxylic acid of 1 to 18 carbon atoms, a sulfonic acid and an ester of phosphoric acid.

The organic compounds which are applied, in accordance with the invention, to goethite or to alpha-iron(III) oxide are betaines which act as dipolar ions, having a positive charge on the wholly or at least partially substituted quaternary nitrogen atom and a negative charge of a carboxylic acid, sulfonic acid or phosphoric acid ester radical on at least one of the substituents and in particular have the formula I, i.e. are zwitter-ions peralkylated at the nitrogen. Examples are N-oleylmethylaminoacetic acid, N-dimethyl-tridecyclpropiobetaine, phosphoric acid aminoalkyl esters such as $R_2HN^+-CH_2-CH_2OPO_3H^-$ and the calcium salt of the betaine of N,N-dimethyl-N-sulfobenzyl-aniline-3-sulfonic acid.

The use of soybean lecithin in the process of the invention has proved particularly advantageous.

The compounds employed according to the invention may be used in a wide range of concentrations, in general from 0.5 to 10% by weight, preferably from 0.5 to 6% by weight, based on the starting material. The optimum concentration of the particular compound to be used can easily be determined experimentally. Preferably, from 4 to 6% by weight are used to prevent the acicular pigment from sintering during reduction to magnetite. When using, for example, soybean lecithin, such amounts suffice to achieve reduction of the pigment to magnetite by heating the treated pigment in a stream of inert gas, preferably nitrogen, to temperatures in excess of 350° C.

Regarding the magnetic properties, especially the coercive force and residual coercive force, of the pigments obtained, it is particularly advantageous to heat the product to temperatures above 350° C and up to 500° C or more. Even at such high temperatures, no sintering of the acicular particles can be observed. However, if only from 0.5 to 2% of a betaine according to the invention are applied to the pigment to be converted, a reducing gas must additionally be introduced into the reaction chamber when effecting the reduction to magnetite. Suitable reducing agents for this purpose are, in particular, hydrogen or carbon monoxide. However, even such small amounts of the betaine according to the invention suffice to provide excellent protection against sintering of the acicular particles.

Figure 2:
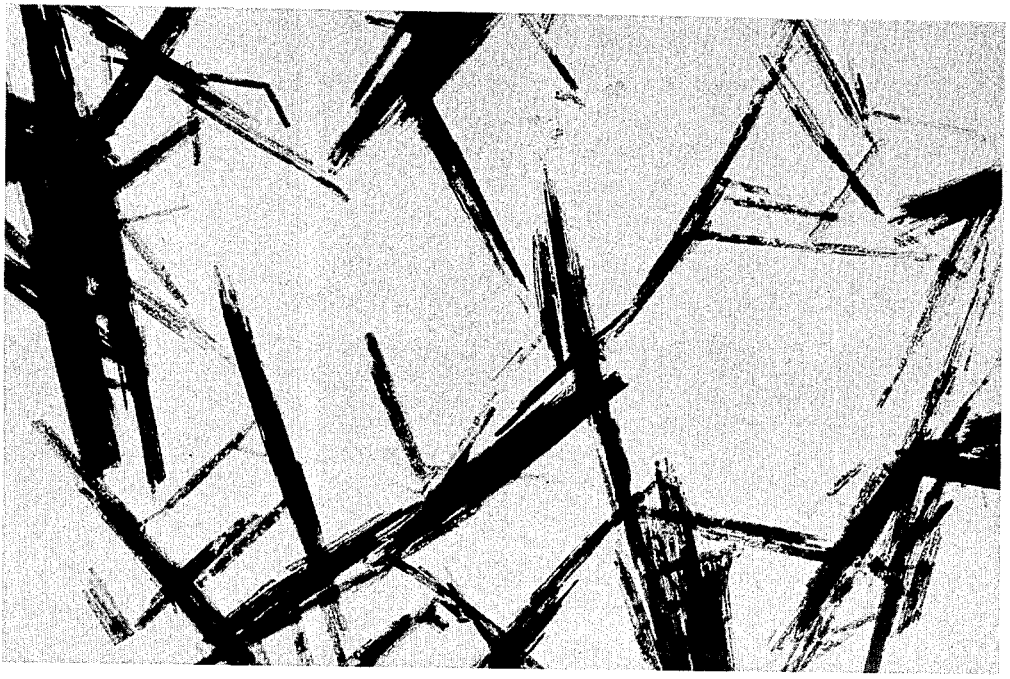

FIGS. 1 and 2 show particularly clearly the advantage of the low degree of sintering of the acicular particles in the conversion of goethite through to the final stage of the gamma-iron(III) oxide. FIG. 1 (magnification 30,000 ×) shows the starting material, namely alpha-FeOOH needles of average length 0.7 μ. FIG. 2 (magnification 30,000 ×) shows the gamma-$Fe_2O_3$ obtained after conversion via the alpha-$Fe_2O_3$ and $Fe_3O_4$ stages, according to the invention. It can be seen that the original shape of the needles is virtually unchanged.

Should it be advantageous to allow a moderate degree of sintering of the goethite needles manufactured to take place because they are too small, the process according to the invention provides a particularly advantageous means of regulating the desired pigment size through the amount of betaine applied and the reduction temperature used.

In the course of developing the process according to the invention, we have found that it can be used with great advantage in the manufacture of cobalt-modified gamma-iron(III) oxides. The manufacture of these magnetic pigments is of great interest because their magnetic properties are better than those of the unmodified pigment, but the incorporation of cobalt into the crystal lattice is known to produce disadvantageous instability. As a result of the almost complete preservation of the acicular shape and hence of pronounced shape anisotropy an advantageous effect can be achieved with the process according to the invention even in the case of cobalt-modified gamma-iron(III) oxide.

According to the process of the present invention, goethite or alpha-iron(III) oxide is suspended in a tenfold amount of water and the suspension is stirred with a high-speed stirrer. After adding the desired amount of the organic compound possessing a betaine structure, stirring is continued for about an hour. After filtration, the treated pigment is dried at from 70° to about 200° C. Conversion is then effected in a rotary furnace or fluidized bed furnace, magnetite being formed at from 300° to 600° C in an inert gas atmosphere or in the presence of reducing gases, depending on the amount of organic compound of betaine structure applied. Further processing to give gamma-iron(III) oxide is carried out by conventional methods at about from 200° to 400° C using an oxygen/nitrogen mixture.

Using the process according to the invention, particularly finely divided gamma-iron(III) oxide pigments, which are readily dispersible in organic binder systems and easily oriented, can be obtained.

To produce magnetic coatings, the gamma-iron(III) oxide manufactured in accordance with the invention is dispersed in polymeric binders. Suitable binders for this purpose are known compounds, such as homopolymers and copolymers of polyvinyl derivatives, polyurethanes, polyesters and the like. The binders are used as solutions in suitable organic solvents which may contain further additives, e.g. to increase the conductivity and abrasion resistance of the magnetic coatings. By grinding the magnetic pigment, binder and any additives, a homogeneous dispersion is obtained which may be applied to rigid or flexible bases such as films, discs and cards.

The invention is further illustrated by the following Examples.

The magnetic properties of the pigments were measured with a vibrating sample magnetometer at a field strength of 800 kiloamps/m, the coercive force ($H_c$) being given in kiloamps/m and the specific remanence $\sigma_R$ and the specific saturation magnetization $\sigma_S$ in $nTm^3/g$ at an apparent density $d$ in $g/cm^3$. Sintering of the acicular particles during conversion, which is prevented by the process according to the invention, was determined on the basis of the orientation ratio $R_f$ of the tape, i.e. the ratio of residual induction in the playing direction to that in the crosswise direction, and by measuring the signal-to-bias noise ratio $B_R$. The magnetic recording media required for this purpose were produced by dispersing the gamma-iron(III) oxide, obtained in accordance with the Examples which follow, in a solution of a copolymer of vinyl chloride, dimethyl maleate and diethyl maleate and a thermoplastic polyester-urethane, using conventional dispersing aids, applying this dispersion by a conventional method to a 12μ thick polyethylene terephthalate film in an amount which gives a 5μ thick magnetic coating after drying, orienting the particles in the fluid coating using a magnetic field, and drying the coating.

The parts and percentages in the Examples are by weight.

COMPARATIVE EXPERIMENT

Goethite (alpha-FeOOH) manufactured in alkaline medium, in accordance with German printed application (DAS) No. 1,204,644, is reduced to magnetite ($Fe_3O_4$) by means of hydrogen in a rotary furnace at 320° C. After cooling to 240° C, the magnetite is oxidized to gamma-iron(III) oxide with a 1 : 1 mixture of air and nitrogen. At a density $d = 0.71$ the magnetic properties were:

$H_c = 30.8$
$\sigma_R = 41$
$\sigma_S = 82$

Figure 3:

FIG. 1 shows an electron micrograph of the alpha-FeOOH starting material. The sintering which occurs during conversion to gamma-$Fe_2O_3$ can be readily observed in FIG. 3.

A tape manufactured with the powder shows an orientation ratio $R_f = 1.94$ and a signal-to-bias noise ratio $B_R = 63.2$ dB.

EXAMPLE 1

3 parts of goethite manufactured as described in German printed application (DAS) No. 1,204,644 are suspended in 30 parts of water and finely dispersed by means of a high-speed stirrer (~10,000 rpm). 0.18 part of soybean lecithin is introduced into this suspension in the course of 20 minutes. After stirring for one hour, the pigment is filtered off and dried at 120° C and about 20 mm Hg.

The pigment treated with soybean lecithin is converted to magnetite in a rotary furnace under nitrogen at 580° C and after cooling to 250° C the product is oxidized to gamma-$Fe_2O_3$ in a stream of a 1 : 1 mixture of air and nitrogen.

The electron micrographs show no difference between the goethite (FIG. 1) and the gamma-$Fe_2O_3$ (FIG. 2). Only at a magnification of 30,000 × do isolated fine pores become visible on the gamma-$Fe_2O_3$ needles.

The following values were measured:

$H_c = 29.6$ $\sigma_R = 41$ $\sigma_S = 80$ at $d = 0.848$ $R_f = 2.51$ $B_R = 65.7$

EXAMPLE 2

The goethite is treated as in Example 1, but 3 percent by weight of soybean lecithin are applied. Drying takes place at 150° C.

The treated pigment is then heated for 10 minutes to 500° C under nitrogen. After cooling to 320° C, the reduction to magnetite is completed in the course of 2 hours, using a mixture of 200 l of hydrogen and 100 l of nitrogen per hour. After carrying out oxidation as described in Example 1, the gamma-$Fe_2O_3$ and the magnetic tape produced therewith were found to have the following values:

$H_c = 30.9$ $\sigma_R = 41$ $\sigma_S = 81$ at $d = 0.61$ $R_f = 2.89$ $B_R = 63.8$

EXAMPLE 3

3% by weight, based on the amount of goethite, of soybean lecithin are added to a strongly alkaline suspension of alpha-FeOOH, as obtained after oxidation of Fe(OH)$_2$ to goethite, and the mixture is stirred for 1 hour. After filtration, the product is washed until neutral and dried at 150° C. 1,000 parts of oxide treated in this way are reduced to magnetite in a rotary furnace at 380° C, in the course of one hour, using a mixture of 200 l of hydrogen and 100 l of nitrogen per hour. After carrying out oxidation as described in Example 1, the magnetic properties of the powder are:

$H_c = 29.6$ $\sigma_R = 39.2$ $\sigma_S = 81.2$ at $d = 0.628$

A magnetic tape produced with the powder has an orientation ratio $R_f = 2.48$ and a signal-to-bias noise ratio $B_R = 64.0$ dB.

EXAMPLE 4

241.5 parts of 85% strength potassium hydroxide solution and 1,000 parts of water are mixed. A solution of 344 parts of FeSO$_4$. 7H$_2$O in 1,300 parts of water is added to this mixture at 40° C, whilst stirring. Stirring is then continued and air at the rate of 150 l/hour is passed through this alpha-Fe(OH)$_2$ suspension until the oxidation to alpha-FeOOH is complete. Sufficient cobalt sulfate solution is then added dropwise to the suspension, whilst stirring, to give 4.35 percent by weight of cobalt, based on the end product Fe$_2$O$_3$. The pigment is filtered, washed until neutral and dried at 180° CF The cobalt-modified alpha-FeOOH thus obtained is then ground and suspended in water, and 6 percent by weight, based on goethite, of soybean lecithin are added. After stirring for one hour, the pigment is filtered off and dried at 120° C and about 20 mm Hg.

The product treated in this way is converted to magnetite under nitrogen at 500° C and, after cooling, the magnetite is oxidized to gamma-Fe$_2$O$_3$ analogously to Example 1.

The powder had the following magnetic properties:

$H_c = 25.2$ $\sigma_R = 46$ $\sigma_S = 83.1$ at $d = 0.65$

The product is distinguished by a particularly narrow field strength distribution.

EXAMPLE 5

Alpha-FeOOH is treated, as described in Example 1, with a betaine of the following structure:

$$\left[ \begin{array}{c} CH_3 \\ \diagdown \\ N^+ \\ \diagup \quad \diagdown \\ CH_3 \quad CH_2 \end{array} \begin{array}{c} \phantom{X} \\ \text{—} \phantom{X} \text{—SO}_3^- \\ \phantom{X} \\ \text{—} \phantom{X} \text{—SO}_3^- \end{array} \right] \tfrac{1}{2} Ca^{++}$$

and then converted to gamma-Fe$_2$O$_3$.

The powder and the magnetic tape produced therewith were found to have the following values:

$H_c = 30.1$ $\sigma_R = 39.2$ $\sigma_S = 80.0$ at $d = 0.557$ $R_f = 2.43$ $B_R = 64.3$

EXAMPLE 6

Instead of the betaine used in Example 5, N-oleylmethylaminoacetic acid is employed, but in other respects the procedure is identical.

The following values were measured:

$H_c = 29.9$ $\sigma_R = 45$ $\sigma_S = 87$ at $d = 0.676$
$R_f = 2.39$
$B_R = 64.1$

EXAMPLE 7

This experiment is carried out as described in Example 1 except that N-dimethyl-tridecylpropiobetaine is employed as the betaine. The powder had the following magnetic properties:

$H_c = 27.8$
$\sigma_R = 40$
$\sigma_S = 85$ at
$d = 0.67$
and the tape the following values:
$R_f = 2.53$
$B_R = 64.4$

We claim:

1. A process for the manufacture of acicular gamma-iron(III) oxide of high coercive force which comprises: contacting an acicular non-magnetic alpha-iron(III) oxide or goethite pigment with a solution of an organic compound; drying the coated pigment, heating the coated pigment to from 250° to 700° C in an inert or reducing gas atmosphere and subsequently oxidizing the magnetite formed in an oxidizing atmosphere at from 150° to 550° C, wherein the pigment is coated with from 0.5 to 10% by weight, based on the pigment, of said compound and is selected from the group consisting of N-oleyl-methylaminoacetic acid, N-dimethyl-tridecyclpropiobetaine, $R_2HN^+—CH_2—Ch_2OPO_3H^-$, the calcium salt of the betaine of N,N-dimethyl-N-sulfobenzyl-aniline-3-sulfonic acid and soybean lecithin.

2. Finely divided gamma-iron(III) oxide pigments, which are readily dispersible in organic binder systems and easily oriented, said pigments being prepared by the process of claim 1.

3. A process as set forth in claim 1 wherein the compound I is soybean lecithin.

4. A process as set forth in claim 1 wherein the alpha-iron(III) oxide or goethite to be treated has been modified with cobalt.

5. A process as set forth in claim 1 wherein the amount of coating compound is from about 4–6% by weight.

* * * * *